United States Patent [19]

Patel

[11] 3,952,596
[45] Apr. 27, 1976

[54] UNIVERSAL MOUNTING FOR BI-METALLIC THERMOMETER

[75] Inventor: Jagdish Patel, Cincinnati, Ohio

[73] Assignee: Palmer Instruments, Inc., Cincinnati, Ohio

[22] Filed: Dec. 17, 1974

[21] Appl. No.: 533,667

[52] U.S. Cl............................ 73/363.9; 73/343 R
[51] Int. Cl.² ........................................ G01K 5/64
[58] Field of Search............ 73/363.9, 363.7, 343 R, 73/362.2; 277/81 R

[56] References Cited
UNITED STATES PATENTS

| | | | |
|---|---|---|---|
| 2,601,784 | 7/1952 | Rose | 73/363.9 |
| 3,091,966 | 6/1963 | Huston | 73/363.9 |
| 3,765,689 | 10/1973 | Adams | 277/81 R |

Primary Examiner—S. Clement Swisher
Assistant Examiner—Denis E. Corr
Attorney, Agent, or Firm—Melville, Strasser, Foster & Hoffman

[57] ABSTRACT

A universal mounting for a bi-metallic thermometer comprising a case connector secured to the underside of the thermometer case and a stem connector at the upper most end of the stem. The case connector is telescopingly received within the stem connector and is rotatably adjustable. Means are provided in association with the stem connector to lock the case connector in any desired rotative position. Accordingly, the case, pointer, shaft and bi-metal coil may be rotated to any desired position for easy reading of the calibrated scale, or if necessary, removed from or replaced in the stem connector.

6 Claims, 6 Drawing Figures

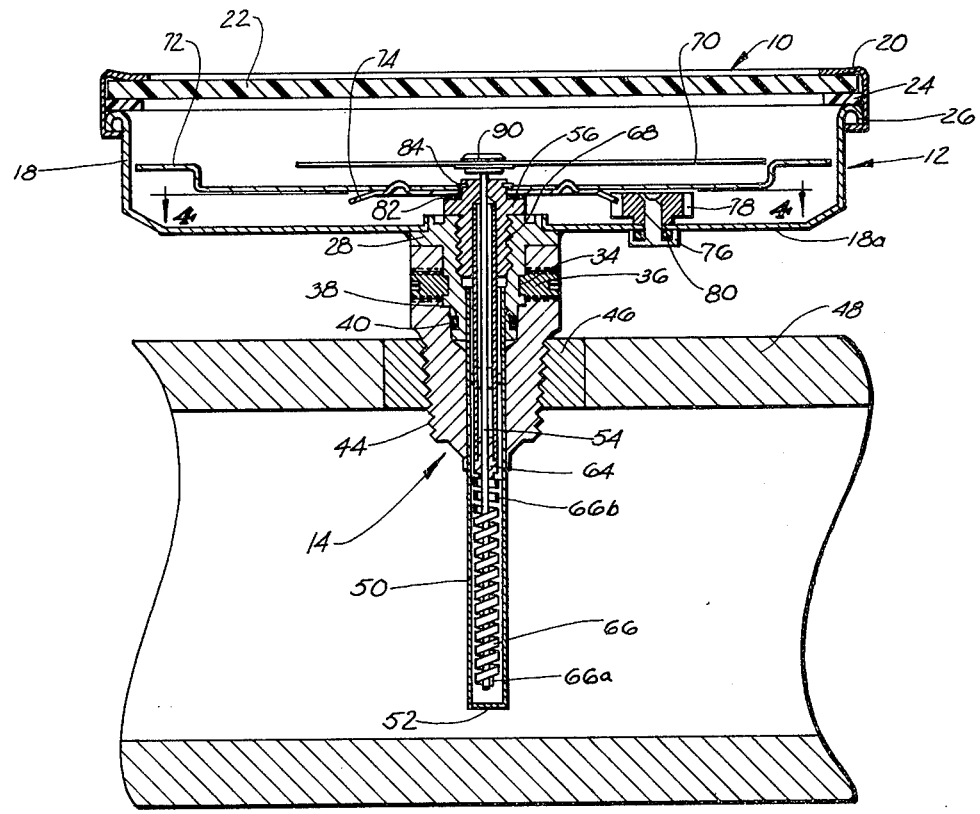
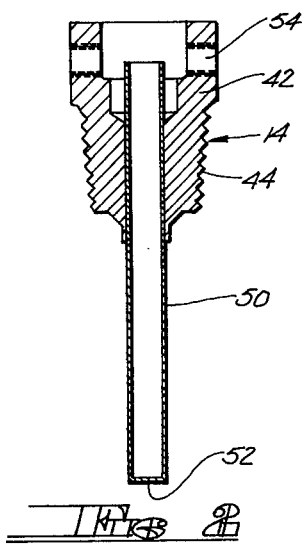
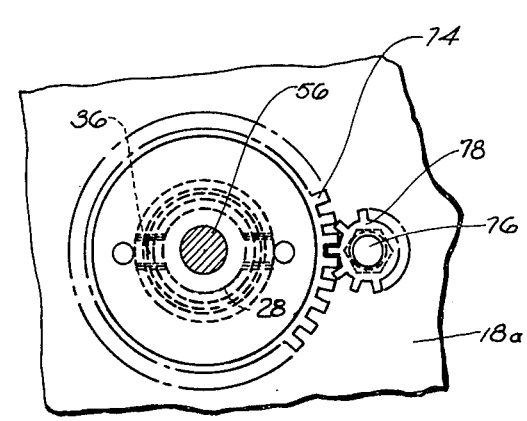
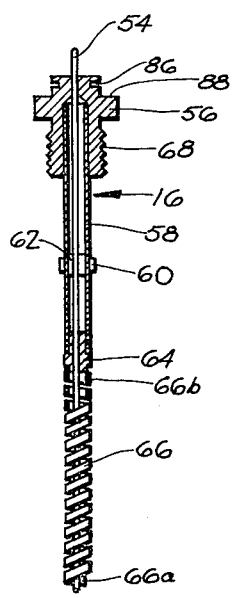

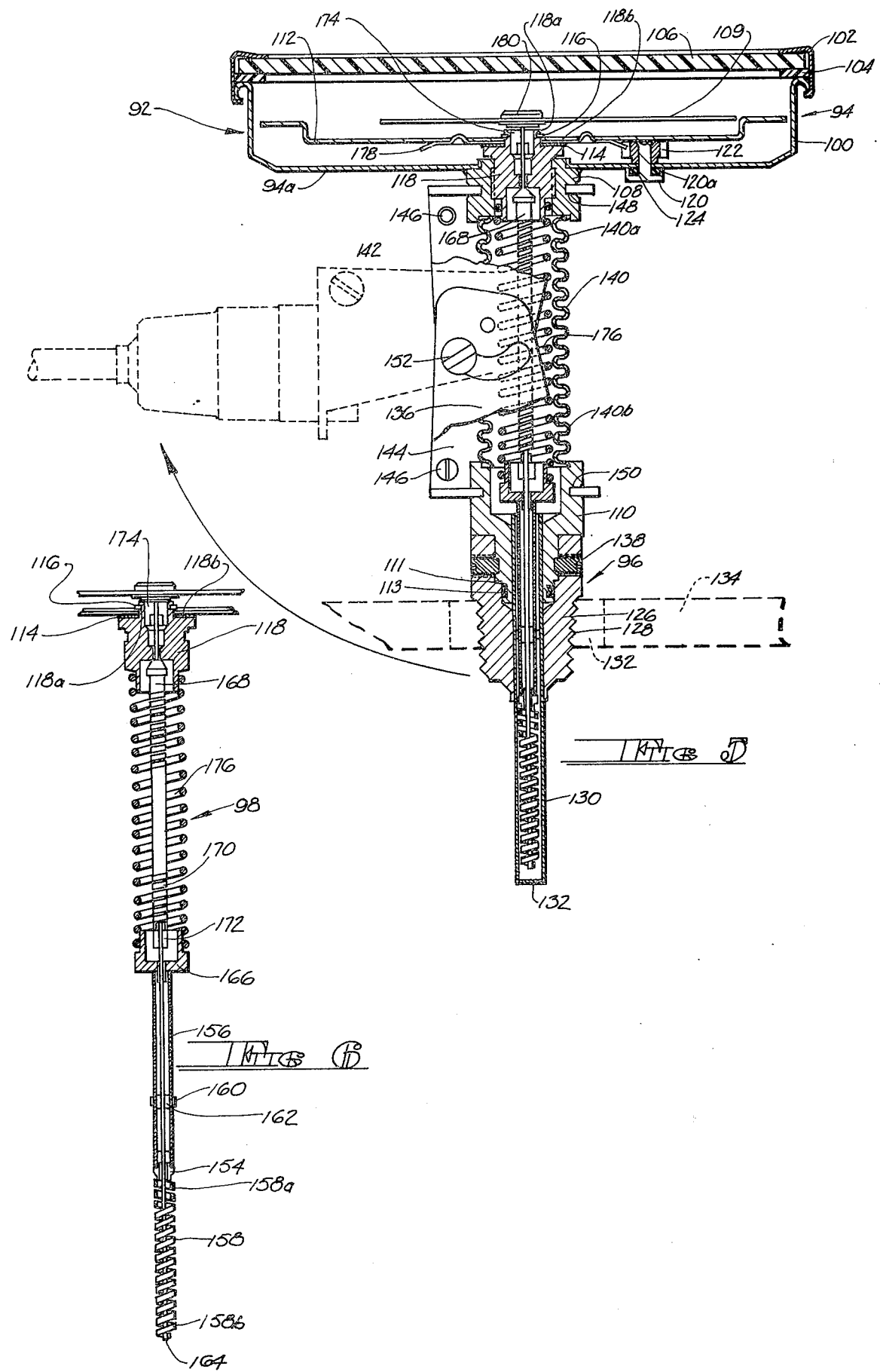

UNIVERSAL MOUNTING FOR BI-METALLIC THERMOMETER

BACKGROUND OF THE INVENTION

1. Field of the Invention

This invention relates to dial indicating instruments of the type used to measure temperature or other variables and more particular to bi-metallic thermometers.

2. Description of the Prior Art

A bi-metallic thermometer comprises an enclosure consisting of a stem terminating in a case. A bi-metallic helical temperature sensing coil disposed within the stem imparts rotary motion to a shaft. The shaft extends into the case and a pointer is secured to the end of the shaft. The sensing coil, the shaft and the pointer rotate with variations in temperature. The temperature is indicated on a graduated dial mounted opposite the pointer.

Since dial thermometers are likely to be mounted in many different positions to suit convenience of the particular job in which they are installed, it has generally been necessary for the manufacturer to manufacture a number of different types of dial gages and thermometers to meet industrial requirements. For instance, if a thermometer had to be placed over head, the dial gage had to be built so that the dial tilted downwardly so that it could be read; if the thermometer was to be mounted below the normal line of vision, the dial gage had to be built so that the dial tilted upwardly, etc.

The prior art has made efforts in the past to provide bi-metallic thermometers with multi-angular gages but such efforts have not generally proved satisfactory. In some cases, the thermometers have been inaccurate, the inaccuracy occurring in the calibration between the head and the stem when the head is tilted or rotated with reference to the stem. In other cases, the thermometers have been restricted to angular adjustment in only one place. Also, some thermometers have been subjected to an excessive amount of friction in the indicating mechanism when an adjustment is made between the head and the stem while other thermometers have been unsuited for repeated adjustment, accidental loads or easy cleaning.

SUMMARY OF THE INVENTION

The present invention provides an improvement in a bi-metallic thermometer of the type having an enclosure consisting of a stem terminating in a case, a bi-metal helical temperature sensing coil disposed within the stem, a shaft secured to the sensing coil and extending into the case, the bi-metal coil imparting rotary motion to the shaft, and a pointer secured to the shaft and cooperating with a calibrated scale to provide a direct indication of the temperature effecting the bi-metallic coil.

More particularly, the improvement comprises a case connector secured to the underside of the case, the case connector having an aperture therein for receiving the shaft, and a stem connector at the upper most end of the stem. The case connector is telescopingly received within the stem connector and is rotatably adjustable. Means are provided in association with the stem connector to lock the case connector in any desired rotative position. Accordingly, the case, pointer, shaft and bi-metal coil, may be rotated to any desired position for easy reading of the calibrated scale, or if necessary, removed from or replaced in the stem connector.

In a preferred embodiment the case connector is secured to the case by welding and the stem connector is of hexagonal cross section and provided with a tapered pipe thread, permitting the attainment of a strong and tight joint when threaded into a mated fitting in a duct, pipe line or the like. The case connector is positioned and secured into the stem connector by set screws provided in the stem connector.

In still a further embodiment, the case may be provided with a recalibration mechanism comprising a stud passing through the underside of the case and pinned on a pinion, which meshes with a gear on the underside of the calibration scale. Accordingly, continuous rotation of the stud, and thus the pinion, will cause continuous rotation of the gear and thus the calibration scale, whereby the thermometer may be recalibrated.

Finally, the universal mounting of the present invention may be incorporated into what is commonly termed an "every angle" adjustment which is provided between the case connector and the stem connector.

According to the present invention, the universal mounting enables the dial of a bi-metal thermometer to be turned for convenient reading without introducing calibration errors. Furthermore, the dial may be recalibrated, if necessary. Finally, the stem portion of the thermometer may be used as a socket or well itself, in which case the case assembly with the actuator mechanism may be replaced if it is desired.

The universal mounting of the present invention may be used for back connected and all angle connected bi-metal thermometers. Any angle position may be obtained for best reading or viewing of the dial by means of external adjustment without removing the glass cover of the case. A friction adjustment type pointer is eliminated. As previously indicated, the removable stem assembly itself may be used as a well, eliminating the use of high cost wells.

BRIEF DESCRIPTION OF THE DRAWINGS

FIG. 1 is a cross sectional view through a bi-metallic thermometer incorporating the universal mounting of the present invention.

FIG. 2 is an enlarged cross sectional view through the stem assembly of the thermometer of FIG. 1.

FIG. 3 is an enlarged cross sectional view through the actuator assembly of the thermometer of FIG. 1.

FIG. 4 is a cross sectional view taken on the line 4—4 of FIG. 1.

FIG. 5 is a cross sectional view through an every angle bi-metallic thermometer provided with the universal mounting of the present invention.

FIG. 6 is an enlarged cross sectional view of the actuator assembly of the thermometer of FIG. 5.

DESCRIPTION OF THE PREFERRED EMBODIMENTS

A typical bi-metallic thermometer 10, which may utilize the universal mounting of the present invention, is disclosed in FIG. 1. As will be seen, the thermometer 10 comprises a case assembly 12, a stem assembly 14 and an actuator assembly 16.

The case assembly 12 consists of a cup shaped metal case 18 with a bezel ring 20, a transparent glass or plastic window 22 and a resilient gasket 24. The bezel ring 20 may be a cam-type having notches so that it may be removable or it may be spun firmly over the flange 26 on the case 18, effecting a tight hermetical seal between the window 22 and the case 18. A case connector 28 is secured, preferably by welding, to the underside 18a of the case 18. The case connector 28 is provided with a groove 34 for the set screws 36, and also with another groove 38 for receipt of the O-ring 40 for sealing purposes.

The stem assembly 14, as best seen in FIG. 2 consists of a stem connector 42 of hexagonal cross section provided with a tapered pipe thread 44, permitting the attainment of a strong and tight joint when threaded with sufficient force into a mating fitting 46 in a duct, pipe line or the like 48. A tubular stem 50, with the lower end 52 thereof closed, as by a plug or the like, extends from the stem connector 42. The stem connector 42 is provided with apertures 54 for receipt of the set screws 36, which position the stem assembly 14 on the case connector 28.

The actuator assembly 16, as best seen in FIG. 3, consists of a shaft 54, a bearing 56, actuator tubing 58, spacer 60, guide 62, coil support 64 and bi-metallic coil 66. The shaft 54, which extends into the case 18, is secured, such as by spot welding, to the lower end 66a of the bi-metallic coil 66. The upper end 66b of the coil 66 is secured to the coil support 64 which is in turn secured, such as by spot welding, to the actuator tubing 58. Depending upon the length of the actuator tubing 58, a number of spacers 60 and guides 62 are provided on the actuator tubing 58. The actuator tubing 58 is affixed to the bearing 56. The actuator assembly 16 may be inserted into the stem assembly 14 through the case 18, whereupon mating threads 68 on the bearing 56 and the case connector 28 join the actuator assembly 16 to the case assembly 12.

A pointer 70 is secured to the upper end of the shaft 54. A circular dial 72, graduated in terms of the temperature to be measured, is mounted rotatably on and concentric with the bearing 56. A gear 74 is secured on the underside of the dial and provided with teeth which mesh with a recalibration mechanism. The recalibration mechanism consists of a stud 76, which passes through the underside 18a of the case 18, and a pinned on pinion 78. An O-ring 80 is provided in the stud 76 to seal off the interior of the case 18. The teeth of the gear 74 engage the teeth of the pinion 78 so that continuous rotation of the pinion 78, via the stud 76, causes continuous rotation of the gear 74 and thus the dial 72.

The circular dial 72 and its attached gear 74 are assemblied to the bearing 56 of the actuator assembly 16 with a spring washer 82 and a commonly known C-ring 84, which snaps into a groove 86 in the end of the bearing 56. These parts are pressed and held in continuous frictional contact with the shoulder 88 of the bearing 56 by the spring force of the washer 82.

Bi-metallic thermometers are calibrated at the place of manufacture to a high degree of accuracy. Normal assembly procedures call for calibration of every thermometer by immersing the assembly in a controlled temperature test bath or baths. At a known temperature within the range of the instrument, the pointer 70 is attached to the shaft 54 by means of the hub 90 of the pointer 70. At this time the pointer is aligned with the corresponding graduation on the circular dial 72. The bi-metallic helical coil 66 has been sized to give proper travel of the pointer 70 over the face of the dial 72 for the temperature range selected. After the calibration procedure has been verified to be correct for the instrument's range and accurate within desired limits, the window 22 is secured to the case 18.

Environmental effects such as shock, vibration or small changes in the materials of which the instruments are made can cause loss of the original accuracy of the instrument, resulting in the need for recalibration or adjustment. Such recalibration or adjustment may be accomplished by turning the stud 76, which will rotate the circular dial 72 with respect to the pointer 70.

In operation, when tightening the threads 44 of the stem connector 42 into the main fitting 46 into which it is to be received, the dial 72 does not always arrive at a position where it is easy to read. However, according to the universal mounting of the present invention, repositioning of the face of the circular dial 72 may be easily achieved without loss of calibration. In this regard, all that is required is that the set screws 36 be loosened, such as, for example, by use of an Allen wrench, by turning the screws 36 counter-clockwise, whereupon the case connector 28, which is welded to the underside of the case 18, may be rotated to any desired position. Since the actuator assembly 16 is screwed into the case connector 28, by rotating the case connector 28 along with the case 18, the entire mechanism rotates. Once the face of the circular dial 72 is in its desired position for easy reading, the set screws 36 are tightened.

In certain embodiments it may be desirable to design the stem assembly 14 to be used as a well, in which case the universal mounting will enable various case assemblies 12 and actuator assemblies 16 to be utilized therewith.

In practice, it may be desirable that the set screws 36 be made non-removable from the stem connector 42, such as for example, by meshing the outside threads once they are inserted. In this event the actuator assembly 16 may be rotated along with the case assembly 12, but the actuator assembly 16 can not be taken out of the stem assembly 14 accidentally.

The universal mounting of the present invention may also be utilized with a commonly referred to "every angle" bi-metallic thermometer 92, as shown in FIGS. 5 and 6. As will be seen, the every angle bi-metallic thermometer 92 of FIGS. 5 and 6 also comprises a case assembly 94, a stem assembly 96 and an actuator assembly 98. The case assembly 94 is substantially identical to the case assembly 12 and consists of a case 100, bezel ring 102, gasket 104, transparent window 106, case connector 108, and enclosed parts such as the pointer 109, circular dial 112, washer 114 and C-ring 116, all of which are supported on the bearing 118 of the actuator assembly 98. The case 100 of the case assembly 94 is provided with a recalibration mechanism comprising the stud 120, which passes through the underside 94a of the case 94 and receives the pinion 122. An O-ring 124 is held in position by a groove 120a in the stud 120 in order to seal off the interior of the case 100. The case connector 108 is preferably secured to the underside 94a of the case 94 by welding and maintains the bearing 118 of the actuator assembly 98 in a certain fixed position.

The stem assembly 96 includes a stem connector 126 having tapered pipe threads 128, and a tubular stem 130 with its lower end 132 closed, such as by a plug welded to the tubing. The stem connector 126 is of hexagonal cross section and the tapered pipe threads 128 permit the attainment of a strong and tight joint when the stem connector 126 is threaded with sufficient force into a mating fitting 132 in a duct, pipe line or the like 134. As will be more fully explained hereinafter, the every angle clamp assembly 136 of the thermometer 92 of FIGS. 5 and 6 necessitates the case connector comprising the case connector 108 and the case stem connector 110, with the clamp assembly 136 positioned therebetween. In this regard, the stem connector 126 of the stem assembly 96 is positioned on the case stem connector 110 by two set screws 138.

The stem and case assemblies 96 and 94, respectively, are held together by the bellows tubing 140, one end 140a of which is welded to the case connector 108 and the other end 140b of which is welded to the case stem connector 110. As previously indicated, the case stem connector 110 is positioned and secured into the stem connector 126 of the stem assembly 96 by the set screws 138 provided in the stem connector 126. Additionally, a groove 111 is provided in the case stem connector 110 for receipt of the O-ring 113 for sealing purposes.

The clamp assembly 136 is assemblied so that the case assembly 94 may be pivoted in any plane about the stem assembly 96, as indicated in dashed lines. The clamp assembly 136 includes two clevis clamps 142 and 144 which are held together by the screws 146 and 152. The clamp assembly 136 is held in position on the thermometer 92 by being inserted into grooves 148 and 150 of the case and case stem connectors 108 and 110, respectively. Two opposed screws 152 are provided for tightening or loosening the clamp assembly 136 so that any angular adjustment may be achieved.

The actuator assembly 98, as best seen in FIG. 6, is removable from the case 100. The bi-metallic coil support 154 is secured, as by spot welding, to the actuator tubing 156. The upper end 158a of the helical bi-metallic coil 158 is secured, as by spot welding, to the coil support 154 on the actuator tubing 156. Depending upon the length of the actuator tubing 156, a number of spacer sleeves 160 and guides 162 may be provided on the actuator tubing 156. The lower end 158b of the bi-metallic coil 158 is secured, as by spot welding, to the shaft 164, which passes through the guide 162 into the actuator tubing 156 and terminates in the outer spring support 166. As can be seen, motion is transmitted from the bi-metallic coil 158 to the pointer shaft 168 by the edge wound coil 170, which is supported by the pointer shaft 168 on one end and the inner spring support 72 on the other end. The inner spring support 172 is secured, as by spot welding, to the shaft 164 which carries the bi-metallic coil 158. The pointer shaft 168 passes through the bushing 174 which is inserted into the bearing 118 of the actuator assembly 98. The bearing 118 of the actuator assembly 98 and the outer spring support 166 are held together by the outer spring 176.

During assembly, the actuator assembly 98 is inserted into the case assembly 94 and screwed into the case connector 108. A circular dial 112 having a face graduated in terms of the temperature to be measured is mounted rotatably on and concentric with the bushing 174. The underside of the circular dial 112 is provided with a gear 178 attached thereto so that the circular dial cannot be turned independently therefrom. The teeth of the gear 178 mesh with and engage the teeth of the pinion 122 of the recalibration mechanism so that continuous rotation of the pinion 122, through rotation of the stud 120, will cause continuous rotation of the gear 178 and thus the circular dial 112.

During assembly the circular dial 112 and the gear 178 secured to the underside thereof are assemblied to the bearing 118 of the actuator assembly 98 with the aforementioned spring washer 114 and C-ring 116, with the C-ring 116 snapping into the groove 118a in the end of the bearing 118. These parts are pressed and held in continuous frictional contact with the shoulder 118b of the bearing 118 by the constant spring force of the spring washer 114.

As previously indicated in connection with the thermometer 10 of the embodiment of FIGS. 1 through 4, normal assembly procedures call for calibration of every thermometer by immersing the assembly in a controlled temperature test bath or baths. At a known temperature within the range of the instrument, the pointer 109 is attached to the pointer shaft 168 by means of the hub 180 of the pointer 109. At this time the pointer 109 is aligned with the corresponding graduation on the face of the circular dial 112. The bi-metallic coil 158 is sized to provide proper travel of the pointer 109 over the face of the dial 112 for the temperature range selected.

After the calibration procedure has been verified to be correct for the instrument's range and accurate within the required limits, the case 100 is covered with the bezel ring 102 and the transparent window 106. The gasket 104 is provided between the window 106 and the case 100 in order to assure that the interior of the case 100 is air tight.

In case of loss of the original calibration, the thermometer may be recalibrated by turning the stud 120, which will rotate the face of the circular dial 112 with respect to the pointer 109.

When tightening the threads 128 of the stem connector 126 into a fitting 132 of a duct, pipe line or the like 134, the face of the circular dial 112 will not always arrive in a position allowing for easy reading. However, repositioning of the face of the circular dial 112 may be accomplished without loss of calibration. In this regard, the position of the circular dial 112 in its final desired adjusted angle position whould be visualized. If the position of the dial 112 is not proper for reading the set screws 138 are loosened and the case assembly 94, along with the clamp assembly 136, are rotated just enough to achieve the desired position of the dial 112 for final angle position adjustment, whereupon the set screws 138 are then tightened. In order to achieve the desired angle position adjustment the screws 146 and 152 are loosened. The clamp assembly 136 is then rotated until the longitudinal axes of the screws 146 are substantially perpendicular to the plane of the desired bend. The case 100 is then grasped and the clamp assembly 136 bent to the required angle, whereupon the screws 146 and 152 are tightened.

It will, of course, be understood that if it is unnecessary to change the angle position of adjustment of the face of the dial 112 but only desired to rotate the dial 112, that this may be accomplished by simply loosening the set screws 138, in which case the case stem connector 110, including the clamp assembly 136, actuator 98 and case assembly 94, may all be rotated until the face of the dial 112 is in its desired position whereupon the set screws 138 may be tightened.

It should, perhaps, be noted that the thermometer 92 should be returned to the standard straight position before making any position adjustment by way of the set screws 138.

While certain preferred embodiments of the invention have been specifically illustrated and described, it is understood that the invention is not limited thereto, as many variations will be apparent to those skilled in the art, and the invention is to be given its broadest interpretation within the terms of the claims. For example, while the means in association with the stem connectors 42 and 126 to lock the case connector 28 or case stem connector 110 in any desired rotative position have been shown to comprise set screws 36 and 138, such means could also readily comprise a set screw and a locking pin, clips with tension washers, and the like.

I claim:

1. In a bi-metallic thermometer of the type having an enclosure consisting of a stem terminating in a case, a bi-metal helical temperature sensing coil disposed within said stem, a shaft extending from said coil into said case, said bi-metal helical temperature coil imparting rotory motion to said shaft, and a pointer secured to said shaft and cooperating with a calibrated scale to provide a direct indication of the temperature effecting said bi-metal coil, the improvement, in combination therewith, comprising a case connector secured to the underside of said case, said case connector having an aperture therein for receiving said shaft, a stem connector at the uppermost end of said stem, said stem and stem connector providing a separate socket or well, said case connector being telescopingly received within said stem connector, said case connector being rotatably adjustable in said stem connector, resilient sealing means exterior of said case connector to engage the interior of said stem connector, and means in association with said stem connector and case connector only to lock said case connector in any desired rotative position, whereby said case connector, and thus said case, pointer, shaft and bi-metal coil, may be rotated and locked in any desired rotative position for easy reading of said calibrated scale, or if necessary, removed from or replaced in said stem connector.

2. The bi-metallic thermometer according to claim 1, wherein said case connector is secured to the underside of said case by welding.

3. The bi-metallic thermometer according to claim 2, wherein said stem connector is of hexagonal cross section and provided with a tapered pipe thread, whereby to permit the attainment of a strong and tight joint when said stem connector is threaded into a mating fitting in a duct, pipe line or the like.

4. The bi-metallic thermometer according to claim 1, wherein said locking means comprise at least one set screw.

5. The bi-metallic thermometer according to claim 1, wherein said case is provided with a recalibration mechanism comprising a stud passing through the underside of said case, said stud being pinned on a pinion, and by a gear on the underside of said calibrated scale engaging said pinion so that continuous rotation of said pinion will cause continuous rotation of said gear and thus said calibrated scale, whereby said thermometer may be recalibrated by turning said stud.

6. The bi-metallic thermometer according to claim 1, wherein said case connector includes a case stem connector, said case stem connector being telescopingly received within said stem connector, and wherein an every angle adjustment is provided between said case connector and said case stem connector, said every angle adjustment comprising a clamp assembly so that said case may be pivoted in any plane about said stem, said clamp assembly comprising two adjustable clevis clamps, said case connector and said case stem connector each being provided with a groove for receiving one of said clamps, and by means for tightening or loosening said clamps to achieve any desired angular adjustment of said case and thus said calibrated scale.

* * * * *